United States Patent [19]

Mannillo

[11] Patent Number: 5,787,537
[45] Date of Patent: Aug. 4, 1998

[54] METHOD OF WASHING LAUNDRY AND RECYCLING WASH WATER

[75] Inventor: Richard W. Mannillo, East Falmouth, Mass.

[73] Assignee: Water Recovery Systems, Inc., East Falmouth, Mass.

[21] Appl. No.: 684,031

[22] Filed: Jul. 19, 1996

[51] Int. Cl.⁶ ............................................. D06F 39/00
[52] U.S. Cl. ................ 8/158; 68/18 R; 210/639; 210/748; 210/760; 210/765
[58] Field of Search ................ 8/158; 68/18 R; 210/639, 640, 748, 760, 765

[56] References Cited

U.S. PATENT DOCUMENTS

| | | | |
|---|---|---|---|
| 2,011,083 | 8/1935 | Sando | 68/18 R |
| 4,211,651 | 7/1980 | Thomas | 210/703 |
| 5,087,374 | 2/1992 | Ding | 210/673 |
| 5,097,556 | 3/1992 | Engel et al. | 68/207 X |
| 5,241,720 | 9/1993 | Engel et al. | 8/158 |
| 5,409,616 | 4/1995 | Garbutt et al. | 68/207 X |
| 5,493,743 | 2/1996 | Schneider et al. | 68/207 X |
| 5,505,856 | 4/1996 | Campen et al. | 210/760 X |
| 5,512,178 | 4/1996 | Dempo | 210/760 X |

OTHER PUBLICATIONS

"Cleaning and Laundry World", pp. 34–35, Mar. 1961.

*Primary Examiner*—Philip R. Coe
*Attorney, Agent, or Firm*—Cesari and McKenna, LLP

[57] ABSTRACT

An environmentally safe laundry washing apparatus and method includes a primary solids removal system with an inlet for receiving waste wash water which delivers the water to a separation system and then to a main circulation system which has an ozone source and at least one filter. A final water purification batch treatment system capable of greater than 98% total dissolved solids removal in conjunction with a sterilization device is in fluid communication with the main circulation system, and a washing means is located downstream from the final water purification system. The wash water is recirculated from the washing means after the completion of a wash cycle to an inlet of the primary solids removal system.

12 Claims, 6 Drawing Sheets

METHOD OF WASHING LAUNDRY AND RECYCLING WASH WATER

FIELD OF THE INVENTION

This invention relates to a process for laundry waste water treatment which allows for effective cleaning in a zero discharge environment.

BACKGROUND OF THE INVENTION

With increasing environmental concerns, there is a growing need to provide water recycling processes and laundry facilities which use alternatives to chemical cleaning agents and detergents. Laws and regulations are becoming tighter for chemical discharge into the environment, and alternative methods are being explored.

Ozone has often been used to substitute for detergent in the cleaning cycle of laundry machines and cleaning devices. Ozone is a powerful bleaching and oxidizing agent which can be used to purify and deodorize air, sterilize water, or as a bleach. Ozone is usually formed when oxygen is exposed to ultraviolet light or an electrical charge which breaks it down to individual radicles. The prior art has numerous examples of ozone as a cleaning agent.

For example, in U.S. Pat. No. 5,493,743 a method and apparatus of washing laundry using a reduced amount or even without the use of hot water and detergents is disclosed. The system uses a closed loop or open loop ozonated wash water system where the wash water is maintained in a contact tank and is ozonated by an ozone generator prior to use in the washing machine. The ozone is mixed into the wash water and the ozonated wash water is delivered to the washing apparatus for cleaning the laundry. The oxygen and/or dried air used to generate the ozone is concentrated by an oxygen concentrator before being fed into the generator. The system includes a venturi injector for entraining ozone into the water in the storage and contact tanks. The spent wash water may be collected, filtered and reused, thereby eliminating the waste water disposal problems resulting in considerable water and energy savings. The system also is described as providing an improved laundry treatment system which utilizes a neutral to slightly basic pH that favors hydroxyl radical formation to promote advanced oxidation chemistry in combination with ozone to enhance the cleaning process.

U.S. Pat. No. 5,087,374 discloses a system for removal of impurities that allows for the regeneration of spent absorbants which are used to purify waste water. The system uses spent activated carbon which is immersed in an aqueous bath as water is circulated over the activated carbon. Ultrasonic vibrations are used to desorb activated carbon. The desorbed organic compounds are washed from the activated carbon by the circulating water stream and are decomposed by introducing ozone into the water stream, while subjecting the water stream to ultraviolet radiation. The use of ultraviolet radiation on the water stream allows the stream to be safely discharged to the environment.

U.S. Pat. No. 5,409,616, issued on Apr. 25, 1995 provides a method and apparatus to restore grey water resulting from a cleaning activity such as laundry by using ozone as a cleaning agent in a closed loop system for recycling. This is described in the patent as preserving the water, reducing the system size, and enhancing the efficiency of the cleaning system.

U.S. Pat. No. 5,097,556, issued Mar. 24, 1992 to Engel et al. discloses a method for washing laundry without hot water and detergents using a closed loop ozonated wash water system wherein the wash water is maintained in a storage tank. The wash water is then ozonated by an ozone generator prior to use in a washing machine.

U.S. Pat. No. 5,241,720 is entitled Laundry Waste Water Treatment and Wash Process. This patent provides a method and apparatus of washing laundry without hot water and detergent using a closed loop ozonated wash water system wherein wash water is maintained in a storage tank and is ozonated by an ozone generator prior to use in the washing machine. The ambient air used in the ozone generator to generate the ozone is undried and temperature controlled. The system includes a novel injector including a vacuum pump for entraining ozone into the water in a storage tank. The spent wash water is collected, filtered and reused, thereby eliminating disposal problems. The ozone in this process is being used for the actual wash of the laundry.

U.S. Pat. No. 4,211,651 is entitled Water Reclamation Process. This patent provides for dirty process water to be collected and passed at a uniform rate through a floatation cell where solids are removed. Water from the floatation cell is sterilized and then introduced into a treated water holding tank where it is withdrawn at a uniform rate and filtered to remove further solids. The filtered water is placed in a storage vessel for use in the process facility, as the filtered water is kept at the required temperature by a heat exchange.

SUMMARY OF THE INVENTION

The present invention provides a method to treat waste water in a closed loop, recyclable wash system for use with waste water from laundry machines and other cleaning devices. One feature is the option and ability of controlling the temperature of and simultaneously treating two parallel—separate laundry or other waste streams, one of which is discharged from the laundry waste machines at approximately 75°–85° F., and the other is discharged at 130°–150° F. The present invention uses ozone in a closed loop system for purification of the water, but not for the actual laundry cleaning process. In the present invention, ozone is removed from the process by ultraviolet light before the water is sent to the actual laundry cleaning step. Detergents may not be necessary for the cleaning process either, as the treated/softened water is sufficient for cleaning lightly soiled laundry.

Certain disadvantages occur with a wash system that uses ozone water to clean clothes. Specifically, ozone in the water is harmful to some synthetic fibers and blends. Ozone has minimal effectiveness at oxidizing, penetrating, and removing food stains and animal fats and oils.

The present invention is a grey waste water treatment system capable of simultaneously treating multiple discharge streams with varying respective discharge temperatures including the initial laundry application as herein described. By engineered system sizing and in accordance to application process delivery rate requirements, the invention flow rate capabilities are in multiples of 50 or 100 GPM—as needed.

The laundry wash apparatus is comprised of a primary solids removal system with an inlet to receive waste wash water, a separation system, such as a dissolved air floatation system in fluid communication with the primary solids removal system, a water cooling source in fluid communication with the dissolved air floatation system, a main circulation system in fluid communication with the dissolved air floatation system and water cooling source. The main circulation system has an ozone source and at least one filter means. The apparatus further includes a final water purification system which has a sterilization device, and is in fluid communication with the main circulation system. A washing means is provided in fluid communication with and located downstream from the final water purification system. Means for recirculating the waste wash water after completion of a wash cycle to the inlet of the primary solids removal system are also provided. The system is capable for use with traditional detergent based commercial and residential self serve laundering equipment.

Laundry is washed by the method of introducing the supply of waste wash water to a primary solids removal system for removal of the primary solids and then delivering the wash water supply to a dissolved air floatation separation system to remove further undesired substances such as suspended solids. From there the wash water is delivered to a main circulation system where ozone is mixed and dissolved into the wash water supply and the wash water supply is then delivered to at least one filter means. The wash water supply is then treated with a sterilization device before further filtering with a reverse osmosis unit, which is part of the final water purification system. The wash water supply is then delivered to a washing means for washing the laundry and the waste water from the washing means is recirculated after completion of a wash cycle to the primary solids removal system.

The primary solids removal system includes a primary solids tank, a secondary solids tank, a vibrating shaker, a holding tank, and a sludge settling tank. The primary solids tank has an outlet and an inlet which receives waste wash water from an entrance conduit. The vibrating shaker is in fluid communication with the outlet of the primary solids tank, and a secondary solids tank with an inlet in fluid communication with the vibrating shaker. The secondary solids tank has an outlet which is in fluid communication with a first inlet of a holding tank. The holding tank has a plurality of inlets and an outlet. A sludge settling tank with an inlet and an outlet is in fluid communication with a second inlet of said holding tank.

The separation system may include a dissolved air floatation system which removes suspended solids and has a surge tank with a plurality of inlets and an outlet, with a first inlet in fluid communication with the outlet of the holding tank. There is a retention/pressurization tank with an outlet and also an inlet, which is in fluid communication with the outlet of the surge tank. A dissolved air floatation tank acts as the actual suspended solids separation vessel and has an inlet in fluid communication with the outlet of said retention/pressurization tank. The dissolved air floatation tank also has a plurality of outlets with a first outlet of the dissolved air floatation tank in fluid communication with the sludge settling tank of the primary solids removal system, and a second outlet of the dissolved air floatation tank in fluid communication with a second inlet of the surge tank.

A cooling water source is provided which has an inlet in fluid communication with a third outlet of the dissolved air floatation tank, and an outlet.

The main circulation system includes a main process tank, an ozone source, first, second, third, and fourth filter means. The main process tank has a plurality of inlets and a plurality of outlets, with a first inlet in fluid communication with the outlet of the cooling water source. A first outlet of the main process tank is in fluid communication with a third inlet of the holding tank of the primary solids removal system. The ozone source has an inlet in communication with a second outlet of the main process tank and an outlet in communication with a second inlet of the main process tank. The ozone source is a generic ozone generator component which feeds a contact vessel. The first filter means for filtration of particulate matter has a first filter means inlet in fluid communication with a second outlet of the main process tank, and a first filter means outlet in fluid communication with a third inlet of the main process tank. The second filter means for filtration of particulate matter has an inlet and an outlet, with the second filter means inlet in fluid communication with a third outlet of the main process tank.

A third filter means for filtration is provided which has a plurality of inlets and a plurality of outlets. The third filter means has a first inlet in fluid communication with the second filter means outlet and the third filter means has a second inlet in fluid communication with the second outlet of the main process tank. The third filter means also has a first outlet in fluid communication with a second inlet of the holding tank of the primary removal system.

The fourth filter means has one inlet with several feed sources and one outlet in fluid communication with the second inlet on the holding tank. The inlet is in fluid communication with the backflush from the third filter, with the backflush from the first filter, and with the sluice wash from the second filter.

The final water purification system includes a sterilization device, which may be an ultraviolet light source located downstream and in direct communication with a second outlet of the third filter means. The sterilization device has an outlet allowing part of the sterilized water to pass to a reverse osmosis system which removes dissolved solids and which has an inlet and a plurality of outlets. The reverse osmosis inlet is in communication with the outlet of the sterilization device. The reverse osmosis system has a first outlet in fluid communication with a fourth inlet of the main process tank.

The final water purification system also has an evaporator unit having a first inlet and a plurality of outlets. The first inlet of the evaporator unit is in fluid communication with a second outlet of the reverse osmosis system. The evaporator unit has a first outlet in fluid communication with the inlet of the said cooling water source, and a second outlet in fluid communication with a third inlet of the surge tank of the dissolved air floatation system.

The final surge tank has a plurality of inlets and an outlet, with a first inlet in fluid communication with the outlet of the sterilization device and a second inlet in fluid communication with a third outlet of the reverse osmosis system. The outlet of the final surge tank is in fluid communication with a washer or a hot water heater tank. The waste wash water from the washer is returned to the inlet of the entrance conduit of the primary solids removal system by recirculation means.

Laundry is washed in the present invention by a closed loop wash water system by collecting a supply of reclaimed, waste wash water in a main process tank which is entrained with ozone gas for purposes of disinfecting and enhancing the wetting properties of the process water. At this point the process water is available, on demand to the washing machines, however in route, said process water is further strained and polished via membrane filtration, then on to mixed media filtration, and finally exposure to ultraviolet sterilization which destroys the ozone. The wash water is then delivered to a washing means, where it is used to wash laundry. The waste wash water is then recirculated after completion of a wash cycle. The primary solids and detergents are removed from the wash water by the primary solids removal system and the dissolved air floatation separator, respectively.

The present system allows the advantages of zero overall discharge and control of the total dissolved solids to under 900 parts per million. Strong treatment chemicals can still be used on a small batch basis, followed by isolated batch waste water treatment through on site distillation while adhering to zero discharge. A cost reduced skimmings collection and concentration without the use of a filter press is also provided. The system gives successful odor control and disinfection of recycled water, while achieving practical operational efficiency via an engineered hydraulic balance. The present invention makes full laundry service feasible for remote locations with no traditional discharge options while remaining environmentally sensitive.

DETAILED DESCRIPTION

Figure 1:
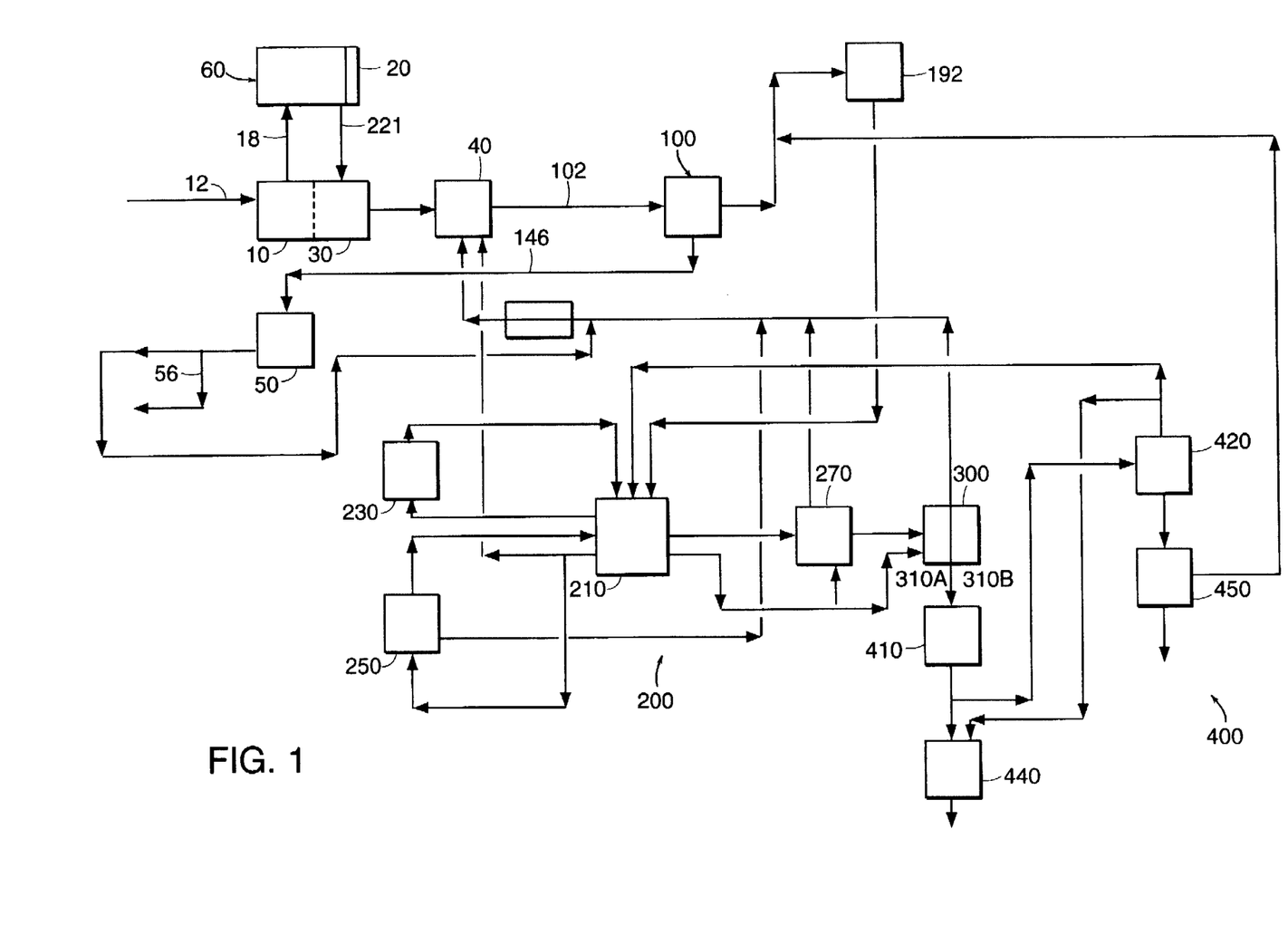
FIG. 1 illustrates a closed loop laundry waste water process in accordance with the present invention.

Fig. 1 is a flow diagram illustrating the method of washing laundry and recycling the wash water of the present invention. The overall flow process is comprised of four subprocesses. These are the following: a primary solid removal system 60, a separation system 100, a main circulation process 200, and a final water purification system 400. The primary solids removal system 60 comprises an entrance conduit for the waste water from the washers 12, a primary solids tank 10 located in the primary solids pit below grade level, a vibrating shaker or screen 20, a secondary solids tank 30 located in a secondary solids pit also below grade level, a holding or surge tank 40, and a sludge settling tank 50.

The separation system 100 is connected to the primary solids removal system 60 by conduit from the surge tank 40 and leading to the settling tank 50. The dissolved air flotation system 100 also leads to the cooling tower 192.

The cooling tower 192 leads to the main circulation process 200 by gravity conduits. The main circulation process 200 comprises a main process cleaning water tank 210, an ozone generator and contact unit 230, a pair of carbon columns 250, a vertical leaf filter 270, and sand filter unit 300. The main circulation process 200 has backflow into the surge tank 40 of the primary solids removal system 60 from the main process water tank 210 and from the two sand filters 310a and 310b. The main circulation process 200 leads to the final water purification system 400 via conduit from the sand filter unit 300.

The final water purification system 400 comprises an ultraviolet light source 410, a storage tank 440 for the final surge by reverse osmosis unit 420 and an evaporation unit 450. Recovered water from the evaporation unit 450 is sent back to the cooling tower 192 and the reverse osmosis unit 420 feeds water back to the main processing clean water tank 210 of the main circulation process 200. Water from the reverse osmosis unit 420 is also sent to the storage tank 440 of the final surge which can then be sent to the washers and the actual laundry machines.

Figure 2:
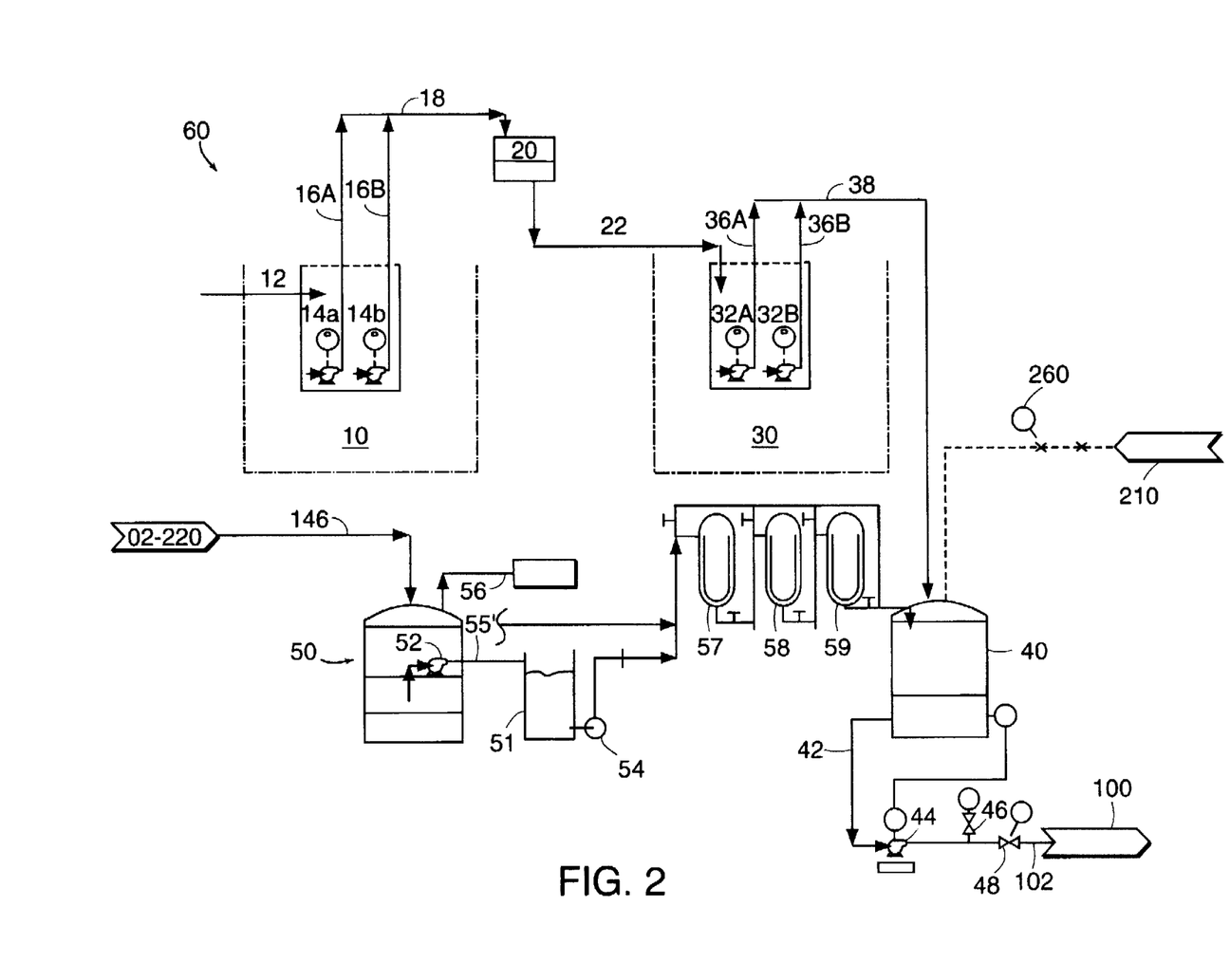
FIG. 2 illustrates a detailed drawing of the primary solid removal system.

Referring to FIGS. 1 and 2, a more detailed showing of the primary solids removal system 60 can be described. Water from the washers enters via conduit 12 to the primary solids removal system 60. The water enters into the primary solids tank 10, located in a primary solids pit below ground level. The primary solids tank 10 has an outlet and an inlet which receives waste wash water from entrance conduit 12. The primary solids tank 10 has a pair of pumps 14a and 14b which pump the water along conduits 16a and 16b, respectively. A vibrating shaker 20 is in fluid communication with the outlet of the primary solids tank 10. Water is brought into conduit 18 and up to the vibrating and shaker screen 20 which removes solids via the shaker screen 20 then travels through conduit 22 and secondary solids pit located below grade and the secondary solids tank 30 with an inlet in fluid communication with the vibrating shaker. Located within the secondary solids tank 30 are two pumps 32a and 32b which pump the water through conduits 36a and 36b through an outlet which is in fluid communication by conduit 38 with a first inlet of holding tank 40. Water from conduit 38 is brought into holding and surge tank 40 which has a plurality of inlets and an outlet. The holding tank 40 also receives water from settling tank 50 via conduit 53 and 55. Water is pumped out of the sludge settling tank 50 by pump 52 through conduit 53 to the liquor intermediate transfer tank 51. The water is pumped from tank 51 by pump 54 through conduit 55 to in series connected bag or multibag filters 57, 58 and 59 into a second inlet of holding tank 40. Sludge is vacuum pumped to an off-site disposal via conduit 56 from the sludge settling tank 50. There is also a ventilation system (not shown) leading from sludge settling tank 50. Sludge settling tank 50 receives its waste water from the separation system 100 via conduit 146.

Referring back to the 1,000 gallon holding tank 40, it also receives water from clean water tank 210 via pump 260 and receives back flush from the two sand filters 300 of the main circulation process 200. Waste water leaves the 1,000 gallon holding tank 40 via conduit 42 and enters into pump 44 which then pumps the waste water through valves 46 and 48 along conduit 102 and into the dissolved air flotation system 100.

Figure 3:
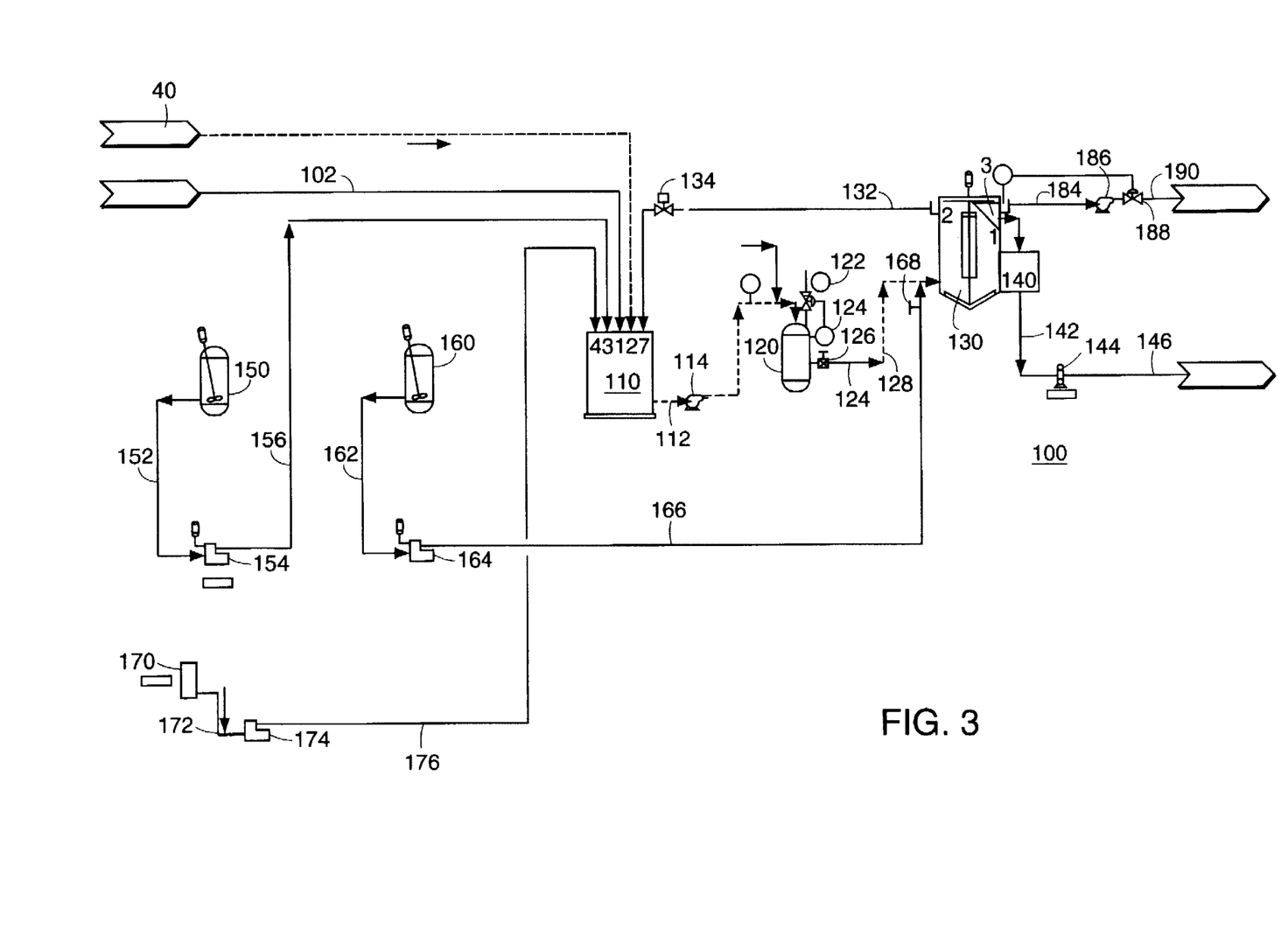
FIG. 3 illustrates the dissolved air flotation system.
Figure 4:
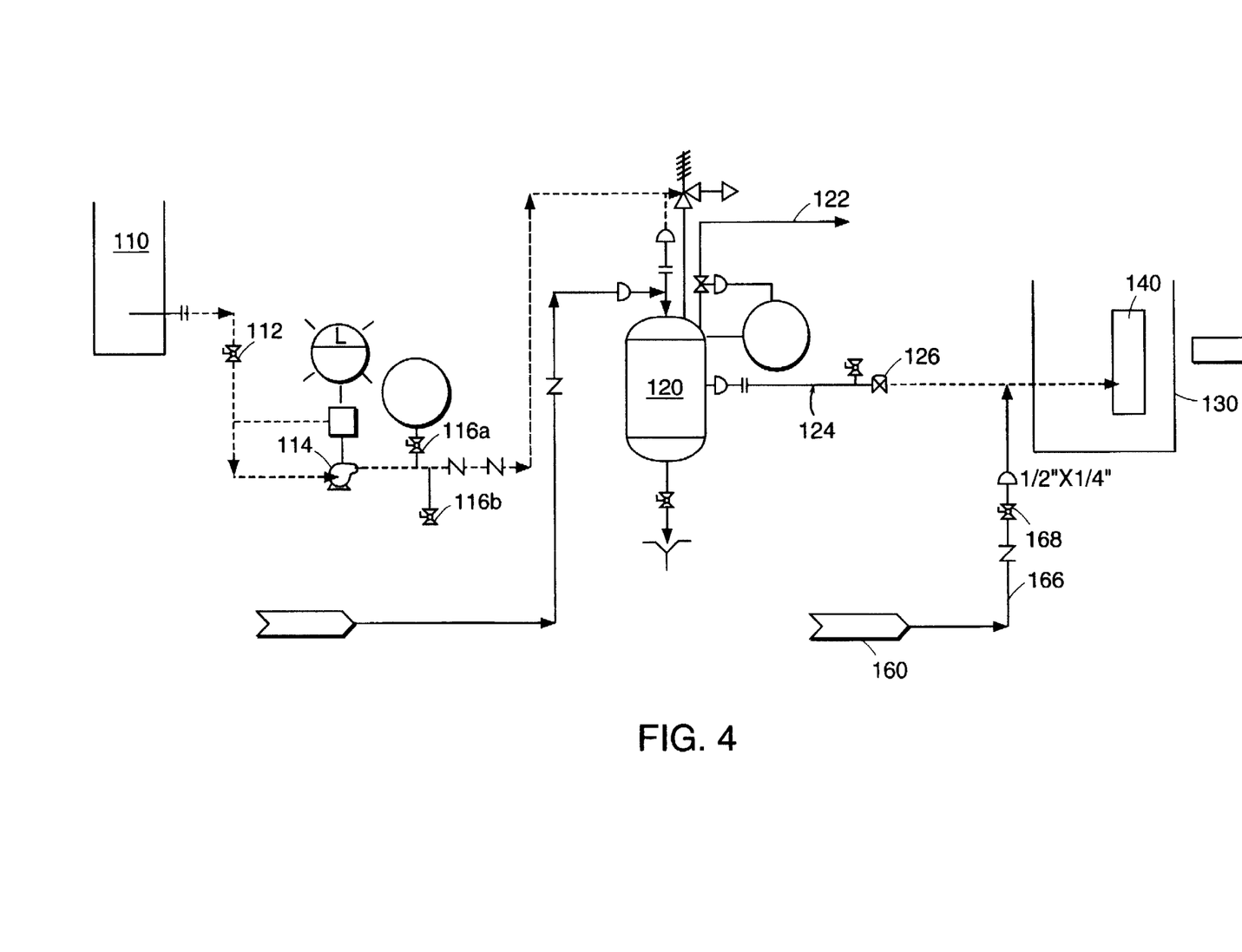
FIG. 4 illustrates a detailed drawing of the dissolved air flotation system.

Referring to FIGS. 3 and 4, a detailed illustration of the separation system 100 can be seen. The separation system 100 comprises a surge tank 110, a retention/pressurization tank 120, a dissolved air flotation tank 130, a skimmings holding tank 140, a polymer mixing tank 150 and a second polymer mixing tank 160, and a polymer additive drum 170. The separation system 100 leads to the water tower 192 and back to the settling tank 50 of the primary solids removal system (see FIG. 1). The surge tank 110 has a plurality of inlets and an outlet, with a first inlet in fluid communication with the outlet of the holding tank 40. The surge tank 110 can be a two hundred sixty (260) gallon tank which receives water from conduit 102 and from the hot condensate of the final filtration process 400 via gravity flow. Polymer is added via conduits 156 and 176 into the surge tank 110. Without intending any limitation, the polymers can include liquid coagulants, liquid polyamines, and dry granular polyacrylamide, such as the SELfloc line of products made by Southeastern Laboratories, Inc. of Goldsboro, N.C. The water in the surge tank 110 becomes polymerized causing any dirt to become coagulated. The polymer mixing tank 150 can be a fifty (50) gallon tank with a 0.25 horse power mixer which can make 350 revolutions per minute. The polymer mix leaves the tank 150 via conduit 152 and enters a polymer metering pump 154 that has the capacity of approximately 22 gallons per hour at 100 psi. The pump 154 has one quarter horse power and can make approximately 1,750 revolutions per minute. The polymer mix is then pumped through conduit 156 to the surge tank 110. Similarly, a polymer additive drum 170 discharges additive through conduit 172 to additive metering pump 174 which pumps via conduit 176 to the surge tank 110. Water from the surge tank 110 leaves the tank by conduit 112 and process pump 114. The process pump has the capacity of 50 gallons per minute at 160 ft. and has 3 horse power and 3,450 rpms. The pump 114 brings the water to the pressurization and retention tank 120.

The pressurization and retention tank 120 which normally operates in a pressure range of 40–50 psi in a preferred embodiment has an outlet and an inlet, which is in fluid communication with the outlet of the surge tank 110. Along this process, air is dissolved into the water by injection. The pressurization and retention tank 120 may have the capacity of forty-nine (49) gallons and vents to the atmosphere by vent 122. Water leaves the retention and pressurization tank 120 by conduit 124 through valve 126 and by conduit 128 enters into the dissolved air flotation tank 130.

The dissolved air floatation tank 130 has a plurality of outlets with a first outlet of the dissolved air floatation tank in fluid communication with the preliminary skimmings collection tank 140, and sludge settling tank 50 of the primary solids removal system 60. A second outlet of the dissolved air floatation tank 130 is in fluid communication with an inlet of the surge tank 110. In the preferred embodiment, dissolved air flotation tank 130 has the capacity of 1,165 gallons, a surface area of 28 sq. ft. and the tank 130 has one half horse power at variance speed and can make 2.25 revolutions per minute.

Before entering the dissolved air floatation tank 130, the water receives further polymerization by system 160. The polymer mixing tank 160 has the capacity of about 50 gallons in a preferred embodiment and a mixer of 0.25 horse power and 350 revolutions per minute. Polymer is discharged from the tank 160 through conduit 162 to polymer metering pump 164. Similar polymers as described above may also be included here. The polymer metering pump 164 has the capacity of 22 gallons per hour at 100 psi and one quarter horse power with 1,750 revolutions per minute. Polymer is injected through conduit 166 and valve 168 to the water that has been discharged from retention and pressurization tank 120 prior to entering dissolved air flotation tank 130.

A skimming holding tank 140 with a capacity of approximately 200 gallons is connected to the DAF tank 130. Water from the skimmings holding tank leaves the tank 140 via conduit 142 and pump 144. This sludge is then transported by conduit 146 back to settling tank 50 of the primary solids removal system 60 (see FIG. 1). Water from dissolved air flotation tank 130 is pumped along conduit 184 through pump 186 to a cooling water source 192 which may be a water tower.

Figure 5:
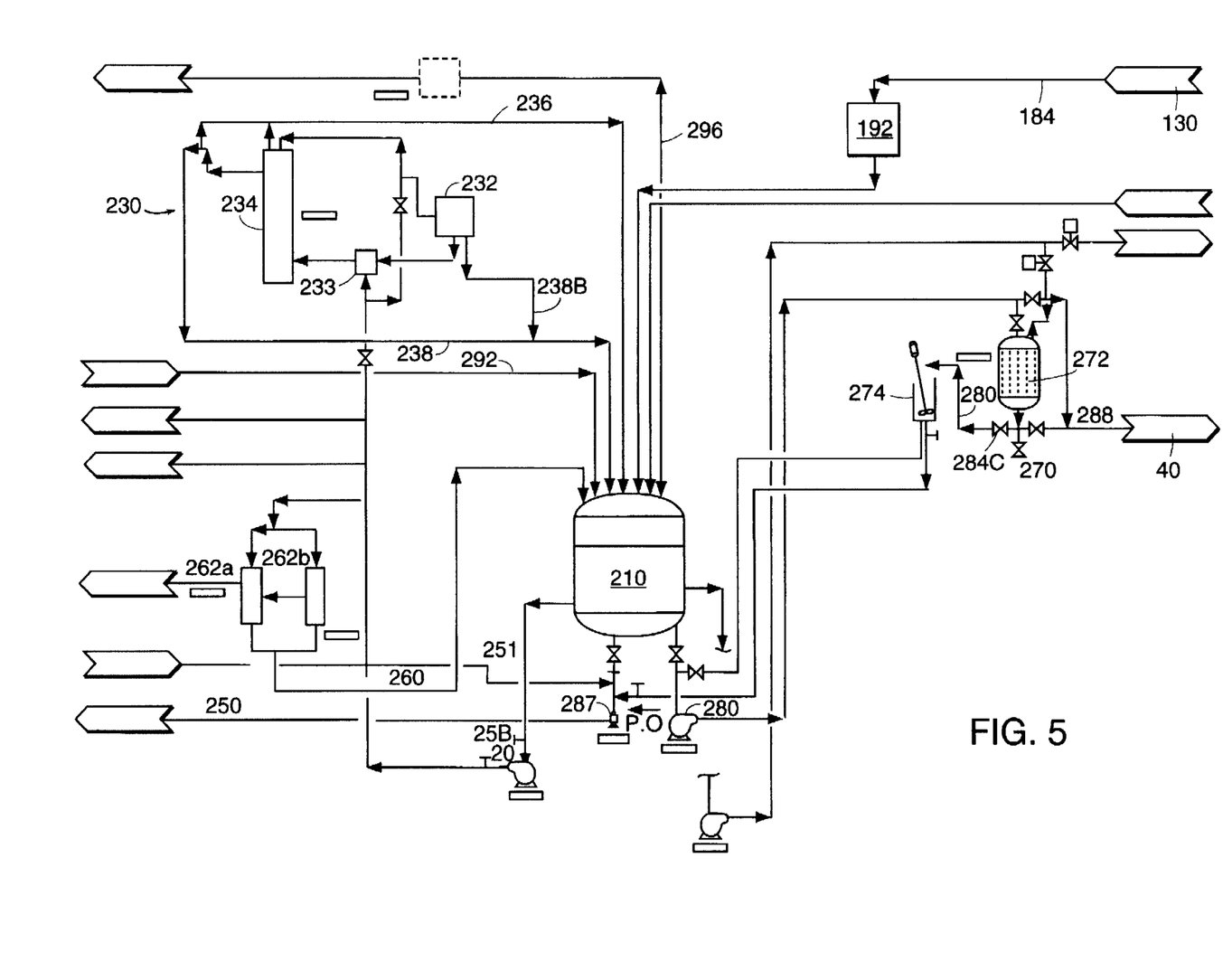
FIG. 5 illustrates the main process tank and the multiple side loops which circulate from the tank.

Referring to FIG. 5, the cooling water source 192 has an inlet and an outlet. The inlet is in fluid communication through conduit 184 with a third outlet of the dissolved air floatation tank 130. The water is pumped by pump 186 through valve 188 and conduit 190 to water tower 192. The pump 186 has the capacity of 50 gallons per minute at 120 ft. The pump 186 may have up to 5 horse power and make 3,450 revolutions per minute. The tower 192 is an enduced draft galvanized steel tower, capable of delivering 100 gallons per minute and may be any of the known equipment in the art, such as a Marley Tower. Water is also recirculated from the dissolved air flotation tank 130 back to the surge tank 110 through conduit 132 and valve 134. Water from the cooling tower 192 is brought by gravity flow to the main circulation process 200 and the main processing tank 210.

The main circulation system includes a main process tank 210, an ozone source 230, first 250, second 270, third 300, and fourth filter means 330. The main process tank 210 has a plurality of inlets and a plurality of outlets, with a first inlet in fluid communication with the outlet of the cooling water source 192. A first outlet of the main process tank is in fluid communication with a second inlet of the settling tank 50 of the primary solids removal system. The ozone source 230 has an inlet in communication with a second outlet of the main process tank and an outlet in communication with a second inlet of the main process tank. The first filter means for filtration of particulate matter may include carbon columns 250a and 250b which remove trace surfactants and organics. The first filter means 250 has a first inlet in fluid communication with the second outlet of the main process tank, and the outlet of the first filter means is in fluid communication with a third inlet of the main process tank. The second filter means for filtration of particulate matter may be a leaf filter unit 270. The second filter 270 has an inlet and an outlet, with the inlet of the second filter in fluid communication with a third outlet of the main process tank 210. The third filter unit 300 can comprise a pair of sand filter units. The third filter unit has a plurality of inlets and a plurality of outlets. The third filter unit has a first inlet in fluid communication with the outlet of the second filter means and the third outlet of the main process tank 210. The third filter 300 has a second inlet for receiving back flush which is in fluid communication with a fourth outlet of the main process tank 210. The third filter means 300 also has a first outlet in fluid communication with a third inlet of the holding tank 40 of the primary removal system 60. The fourth filter means 330 has one inlet with several feed sources and one outlet in fluid communication with the second inlet on the holding tank. The inlet of the fourth filter means 330 is in fluid communication with the backflush from the third filter 300, with the backflush from the first filter 250, with the sluice wash from the second filter 270, and with the recovered water from the settling tank 50. After passing through the fourth filter, this water is recycled to the holding tank 40.

In the preferred embodiment, the main process tank 210 can be a 3,000 gallon tank and receives ozonated water by gravity flow from the ozone generator and contactor unit 230. The ozone generator 232 is cooled by water line 238B which drains back to tank 210. The ozone contactor unit 234 receive water directly from the main tank 210 via line 256 through valve 258. After the water leaves valve 258 it enters the venturi 233 and the ozone contacting chamber 234. En route, at venturi 233 the process water receives ozone gas from the ozone generator 232, which has an air prep unit and can generate 4 lbs. of ozone per day. Any of several known ozone generators can work in the present system, such as that manufactured by Ozonia, Inc. The ozonated water leaves the ozone contactor 234 by gravity flow line 238 to return to the main process tank 210.

The first filter means comprises a pair of carbon columns 250a and 250b. The carbon columns 250a and 250b remove trace surfactants and organics. In operation, water will leave the main tank 210 by line 256 where it will reach pump 260. Pump 260 is a standard circulation pump with capacity of 100 gallons per minute at 140 ft. It has one half horse power and can make 3,450 revolutions per minute. The pump 260 brings the water to the valves 262a and 262b where the water enters the carbon columns 250a and 250b. The water, after leaving the carbon columns, is then delivered to the main tank 210 by line 266.

The leaf filter unit 270 comprises leaf filter 272 and the precoat tank 274. The leaf filter is a large vertical leaf filter with an area approximately 140 ft. sq. The tank 274 is portable and adds a cellulose solution to the water. The leaf filter unit 270 removes traces of detergent left by the dissolved air floatation system 100.

In operation, water travels from the main tank 210 through line 276 and valve 278 to the final filtration pump 280. This pump 280 has capacity for 50 gallons per minute at 150 ft. The pump 280 has 5 horse power and can make 3,500 revolutions per minute. From the pump 280, water travels to the leaf filter unit 270 through leaf filter 272 after passing through valve 282. Water is also received from line 216 and pump 214 into leaf filter 272. After leaving the leaf filter 272, the water reaches valves 284a, 284b and 284c. From valve 284a, the water is brought by conduit 286 to the precoat tank 274. It then goes through valve 289 and is recycled back by the pump 280 to the leaf filter 272. Water from leaf filter 272 goes to valve 284b through the precoat tank 274 pump 287, and is then pumped to settling tank 50. The water from the leaf filter 272 is processed from valve 284c and line 288 to the sand filter unit 300.

The main process tank 210 also receives makeup fresh municipal water along line 292. A water softener (not shown) may be used before the public water supply enters the tank 210 for deionization purposes. Rainwater can be collected as the soft water to be put into the tank 210 for starting up the system. The main process tank 210 can also release decomposed ozone along vent line 296. The tank 210 uses a pump 260 to bring water back to surge tank 40. This keeps dissolved air flotation unit 100 running when demand is low.

Figure 6:
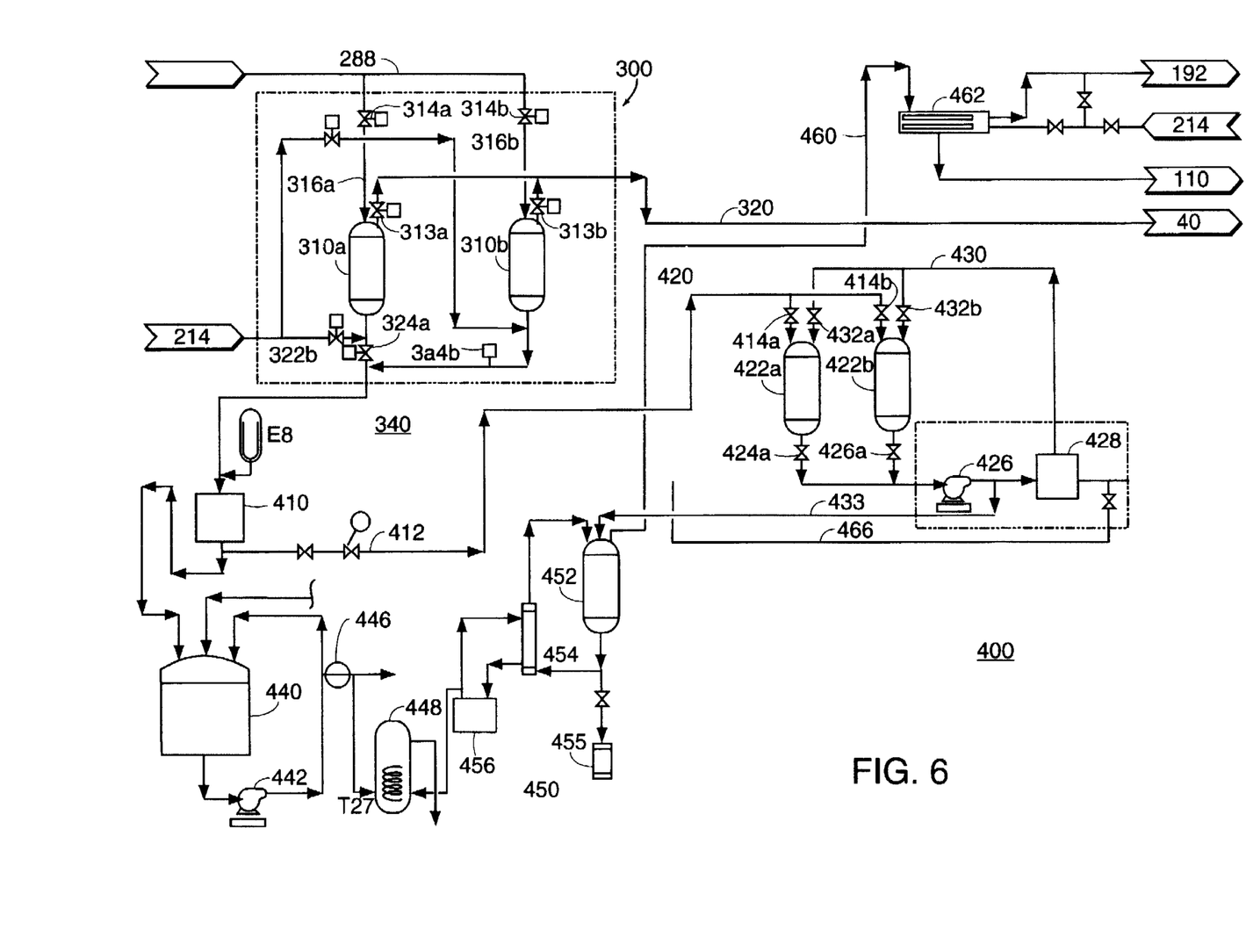
FIG. 6 illustrates the ultraviolet filter and reverse osmosis treatment process of the wash water prior to entry into the washing apparatus.

Referring now to FIG. 6, there is shown a sand filter unit 300 and the final water purification system 400. The sand filter unit 300 comprises a first sand filter 31 0a and a second sand filter 310b, which operate in parallel. The sand filter unit 300 can be any of the known types manufactured, such as a Culligan Inc. type system. The sand filter unit 300 receives water from the second leaf filter 272 along line 288. The water splits along lines 316a and 316b after passing through valves 314a and 314b. Line 316a brings the fluid to the first sand filter 310a and line 316b brings fluid to second sand filter 310b. Back flush escapes from filters 310a and 310b via valves 318a and 318b respectively and is brought along line 320 to holding tank 40 (See FIG. 1). After leaving sand filters 310a and 310b, fluid receives backflush from the main process tank 210 through pump 214 along lines 322a, and 322b respectively. Fluid from sandfilter 310a passes through valve 324a and fluid from sand filter 310b passes through valve 324b.

Referring now to FIGS. 2 and 6, the fourth filter unit 330 can be seen in fluid communication with the third filter unit 300. Backflush from filters 310a and 310b escapes via valve 318a and 318b, respectively, and is brought along line 320 to the fourth filter system 330. This fourth filter means 330 comprises a plurality of multibag filters connected in series 57, 58, and 59. This filter 330 also receives backflush from the first filter 250 and backflush from the second filter 270. The series connected bag or multibag filters 57, 58, 59 have an outlet that is in fluid communication with an inlet of the holding tank 40 of the primary solids removal system 60.

A fifth filter 340 can be provided as a manually operated safety device, which is in fluid communication with the sand filter unit 300. The fifth filter 340 is normally closed and only opened for the immediate period after going back on-line after mixing up dirt in the sand filters 300. The fluid then enters the final water purification system 400 after the fifth filter 340.

The final water purification system 400 includes a sterilization device, which may be an ultraviolet light source, located downstream and in fluid communication with a second outlet of the third filter means and the optional fifth filter 340. The final water purification system 400 is capable of greater than 98% total dissolved solids removal in conjunction with a sterilization device. The ultraviolet light source 410 has an outlet allowing the sterilized water to pass to a reverse osmosis system 420 which has an inlet and a plurality of outlets. The reverse osmosis inlet is in communication with the outlet of the UV source. The reverse osmosis system has a first outlet in fluid communication with a fourth inlet of the main process tank.

The final water purification system also has an evaporator unit 450 having a first inlet and a plurality of outlets. The first inlet of the evaporator unit is in fluid communication with a third outlet of the reverse osmosis system. The evaporator unit has a first outlet in fluid communication with the inlet of the cooling water source, and a second outlet in fluid communication with a second inlet of the surge tank of the dissolved air floatation system.

The final water purification system 400 comprises an ultraviolet light source 410, a reverse osmosis system 420, an evaporator unit 450 and a final surge storage tank 440. Water from the sand filter unit 300 passes through the sterilization device and ultraviolet light system 410 which destroys the ozone along with bacteria or microbes in the water. Part of the water stream from the ultraviolet source 410 is brought by line 412 to the reverse osmosis system 420. The reverse osmosis system 420 comprises reverse osmosis feed tanks 422a and 422b and a reverse osmosis filter 428 which filters out dissolved solids among other things. Water from line 412 enters the reverse osmosis feed tanks 422a and 422b respectively after passing through valves 414a and 414b respectively. After leaving reverse osmosis feed tanks 422a and 422b the water goes through valves 424a and 424b respectively. From the valves 424a and 424b, the water is pumped by pump 426 into reverse osmosis filter 428. The reverse osmosis filter 428 recycles the water by conduit 430 back to the reverse osmosis feed tanks 422a and 422b after passing through valves 432a and 432b respectively. Permeate from the reverse osmosis filter 428 is recycled to the main processing tank 210 (See FIG. 5). It is important to note that this is a batch process reverse osmosis system and is not continuous. The remainder in the reverse osmosis system 420 goes to the evaporator vessel 452 which is hooked up to boilers 454 and 456. The boilers comprise a water re-boiler 454 and a steam boiler 456 which is a high pressure steam source for re-boiler 454. The steam boiler may be chosen from any of the numerous known boilers in the art which are capable of at least 100 psi, such as an Atmospheric Steam Boiler manufactured by Bryan, Inc. From the water re-boiler 454, steam is fed into evaporator vessel 452. After evaporation, any remainder slurry from the evaporator vessel 452 is removed for off site disposal 458. Water vapor from the evaporator 452 is removed by conduit 460 to overhead condenser 462 which vents to the atmosphere. The condenser 462 receives cooling water from pump 260 and discharges water to the cooling tower 192. The condenser 462 also removes hot condensate to the surge tank 110 by gravity flow (See FIG. 3).

The final surge tank 440 has a plurality of inlets and an outlet, with a first inlet in fluid communication with the outlet of the UV light source and a second inlet in fluid communication with a third outlet of the reverse osmosis system. The final surge tank 440 receives water that has passed through the ultraviolet system 410 and also receives water from the reverse osmosis system through line 466. The outlet of the final surge tank is in fluid communication with washers. Water from the final surge tank 440 goes through a final product pump 442 and this is the water which is actually distributed to the residential self serve washers and used to clean the laundry. Excess water from final product pump 442 is brought through valve 444 and recycled back into the final surge tank 440. Water from tank 440 may also pass through pump 442 to process water meter 446 into steam hot water tank 448 which receives steam input from boiler 456. From the steam hot water tank 448, water is brought to commercial washers. The waste wash water from the residential and commercial washers is returned to the inlet 12 of the entrance conduit of the primary solids removal system 60 by recirculation means.

The steam boiler 440 may be connected to other various cleaning equipment. These include, but are not limited to, an ironer, presses, dryers, stain removal equipment, and water heaters.

In operation, dirty waste water from a washing machine enters the primary solids removal system 60 along conduit 12 and enters into the primary solids tank 10. The tank 10 removes primary solids of the nature of coins, heavy solids, granules, etc. From tank 10, the water is brought to the vibrating screen 20 where the course lint is removed. The water supply is brought back down to tank 30 which is a receiving tank, before being transferred to the holding tank 40. When the level of water in the dissolved air floatation system 100 reaches a selected level, water is transferred from the holding tank 40 to the dissolved air floatation system 100. The dissolved air floatation system 100 can be any of the known commercial equipment available, such as that produced by Jalbert, Inc., which has a rate of 50 gallons per minute. While at the dissolved air floatation system 100, the water receives polymer addition in diluted form. The polymer flocculates the suspended solids in the dissolved air floatation system to make them into larger particles of organics, detergents, oils, greases, etc. The dissolved air floatation device entrains into the flocculated water mixture and introduces dissolved oxygen from ambient air. The dissolved oxygen attaches to the flocculated particles, which then float to the surface and can be swept off as skimmings. This dirt goes to the sludge and settling tank 50. While at the sludge settling tank 50, the sludge sinks and stratification occurs between the water and sludge layers. The water above the sludge line is taken out and recirculated back to the system via the series connected multibag filters 57, 58 and 59. From these filters, the water is delivered back to the holding tank 40 and then to the dissolved air floatation system 100.

The clean water from the dissolved air floatation system goes to cooling tower 192 where the water is only cooled with no chemical changes. From the tower altitude, the clean water will travel back to the clean water tank 210.

At the clean water tank 210, the water will be entrained with ozone in the contactor 23 4 and is circled back to the tank 210 on a continuous basis. The ozone oxidizes any trace organics or surfactants in the water. The clean water tank also delivers water to the activating carbon membrane filters 250 which act as a sponge to remove trace organics and trace surfactants. The back flush from the activated carbon filters 250 is delivered to the bag or multibag filters 57, 58 and 59. From the clean water tank 210, the water supply can travel to the leaf filter 270 which acts as a prefilter tank for sand filter units 300. These two filter systems remove further trace organics and surfactants. The sluice wash from leaf filter 270 is delivered back to the multibag filters system 330 which in essence, rinses the leaf filter 270. After traveling through the leaf filter 270 and sand filters 300, only dissolved solids are left in the water supply.

With regard to the multibag filter system 330, the multibag filters are arranged with descending micron size filters in a range of 100 to 1 micrometers. This range, however, is flexible for each operation and can be changed on an as needed basis. The multibag filter system 330 receives backflush from the carbon membrane filter 250, from the vertical leaf filter 270, the recovered water from the settling tank 50, and the backwash from the sand filter 300.

Sterilization device 410 is used to sterilize the water after it leaves the sand filters 300. This sterilization device is preferably ultraviolet light. Part of the sterilized water is brought to the reverse osmosis unit 420 which immediately creates clean water permeate which can be delivered back to the clean water tank 210. The RO membrane rejects high concentrate brine back to the batch feed tank 420 which volume continues to reduce while increasing in concentration. This remainder is known as a batch heel. At a level of 10% batch, which is defined as 10% remainder of a 1000 gallon batch heel, the 10% batch is brought to the evaporator unit as brine. The evaporator 450 recovers hot water as cleaned condensate which is sent back to cooling tower 192. Any solids and sludge developed by the evaporator is collected for removal to an off-site disposal.

After leaving the UV unit 410, that part of the processed water stream which does not go to the RO feed tank 420 is sent to the storage tank 440 and then to the washers where it can be used for cleaning laundry either in a residential or commercial nature. After completion of a wash cycle, the waste water can be recirculated back to the primary solids system 60 by any known means, including pumps and gravity flow type systems.

A metering pump can be added in combination with the washers to allow for the addition of detergent into the washing machines in predetermined amounts.

The pH of the water throughout the system is attempted to be maintained at approximately 7 and a temperature range of the commercial water can go from a high of about 160° F. to the water that is processed in the main tank 210 at a temperature of 85° F.

It should also be noted that any ozone gases go through the ozone destructor before reaching the outside environment. Additional catalysts such as magnesium dioxide can be utilized to neutralize any collected off gassed ozone from any of the system process tanks and ensure the ozone is destroyed before any ozone gas would reach the atmosphere.

Further modifications of the invention disclosed will occur to those skilled in the respective arts and all such modifications are deemed within the scope of the invention as defined by the appended claims.

What is claimed is:

1. A method of washing laundry comprising the steps of:
   a.) collecting a supply of wash water;
   b.) mixing ozone into said wash water supply;
   c.) treating said wash water supply with a sterilization device;
   d.) filtering said wash water supply with a reverse osmosis unit;

e.) delivering said wash water supply to a washing means;

f.) washing said laundry in said washing means;

g.) recirculating said wash water supply after completion of a wash cycle, back to step a.

2. A method of washing laundry comprising the steps of:

a.) introducing a supply of wash water to a primary solids removal system for removal of primary solids;

b.) delivering said wash water supply to a separation system to remove suspended solids;

c.) mixing ozone into said wash water supply;

d.) treating said wash water supply with a sterilization device;

e.) filtering said wash water supply with a reverse osmosis unit;

f.) delivering said wash water supply to a washing means;

g.) washing said laundry in said washing means;

h.) recirculating said wash water supply after completion of a wash cycle to said primary solids removal system.

3. A method of washing laundry comprising the steps of:

a.) introducing a supply of wash water to a primary solids removal system for removal of primary solids;

b.) delivering said wash water supply to a separation system to remove suspended solids;

c.) mixing ozone into said wash water supply;

d.) delivering said wash water supply to at least one filter means;

e.) treating said wash water supply a sterilization device;

f) filtering said wash water supply with a reverse osmosis unit;

g.) delivering said wash water supply to a washing means;

h.) washing said laundry in said washing means; and i.) recirculating said water supply after completion of a wash cycle to said primary solids removal system.

4. The method of claim 3 wherein the at least one filter means of step d) comprises:

a first filter means having carbon columns for removing trace surfactants and organics;

a second filter means having leaf filter from removing surfactants and organics, said second filter means in fluid communication with said first filter means; and a third filter means having at least one sand filter, said third filter means being in fluid communication with said second filter means.

5. The method of claim 4 wherein the at least one filter means further comprises a fourth filter means in fluid communication with said third filter means, said fourth filter means having a plurality of bag filters connected in series.

6. A method of washing laundry by recirculating waste wash water produced after completion of a wash cycle, after introducing an initial supply of wash water, said method including the steps of:

a) introducing a supply of waste wash water to be treated to an associated primary solids removal system for the removal of primary solids from said waste wash water, b) delivering water treated by said primary solids removal system to an associated dissolved air flotation separation system and dissolving air into said water being treated, and separating out undesired substances including suspended solids, c) delivering said water treated by said air flotation separation system to an associated main circulation system, and in said main circulation system mixing and dissolving ozone into said water being treated, d) delivering said water being treated, after mixing and dissolving said ozone to at least one supplemental filter means, e) passing said water through said supplemental filter means to an associated final water purification system;

f) delivering said water being treated to a washing means;

g) washing said laundry in said washing means;

h) recirculating said wash water after completion of a wash cycle to said primary solids removal system.

7. The method of claim 6 wherein the main circulation system comprises:

a main process tank for receiving said water treated by said dissolved air flotation separation system, said main process tank being in fluid communication with an ozone source and with said supplemental filter means.

8. The method of claim 7 wherein the supplemental filter means comprises:

a first filter means having carbon columns for removing surfactants and organics, said first filter means being in fluid communication with said main process tank;

a second filter means having a leaf filter for removing surfactants and organics, said second filter means being in fluid communication with said main process tank; and a third filter means in fluid communication with said main process tank and having at least one sand filter for removing surfactants and organics.

9. The method of claim 8 wherein the supplemental filter means further comprises a fourth filter means in fluid communication with said third filter means, said fourth filter means having a plurality of series connected bag filters.

10. The method of claim 6 wherein said final water purification system comprises, a sterilization device in communication with said main circulation system; and a reverse osmosis system in fluid communication with said sterilization device and with said washing means.

11. The method of claim 10 wherein said final water purification system further comprises an evaporator unit in fluid communication with said reverse osmosis system.

12. The method of claim 6 including the further step of:

mixing polymers into said water being treated in said dissolved air flotation separation system to coagulate undesired substances into suspended solids, and skimming off said suspended solids from said water being treated.

* * * * *